No. 882,739. PATENTED MAR. 24, 1908.
A. H. BOMMER & W. J. ROBERT.
SHAFT COUPLING.
APPLICATION FILED MAY 28, 1907.
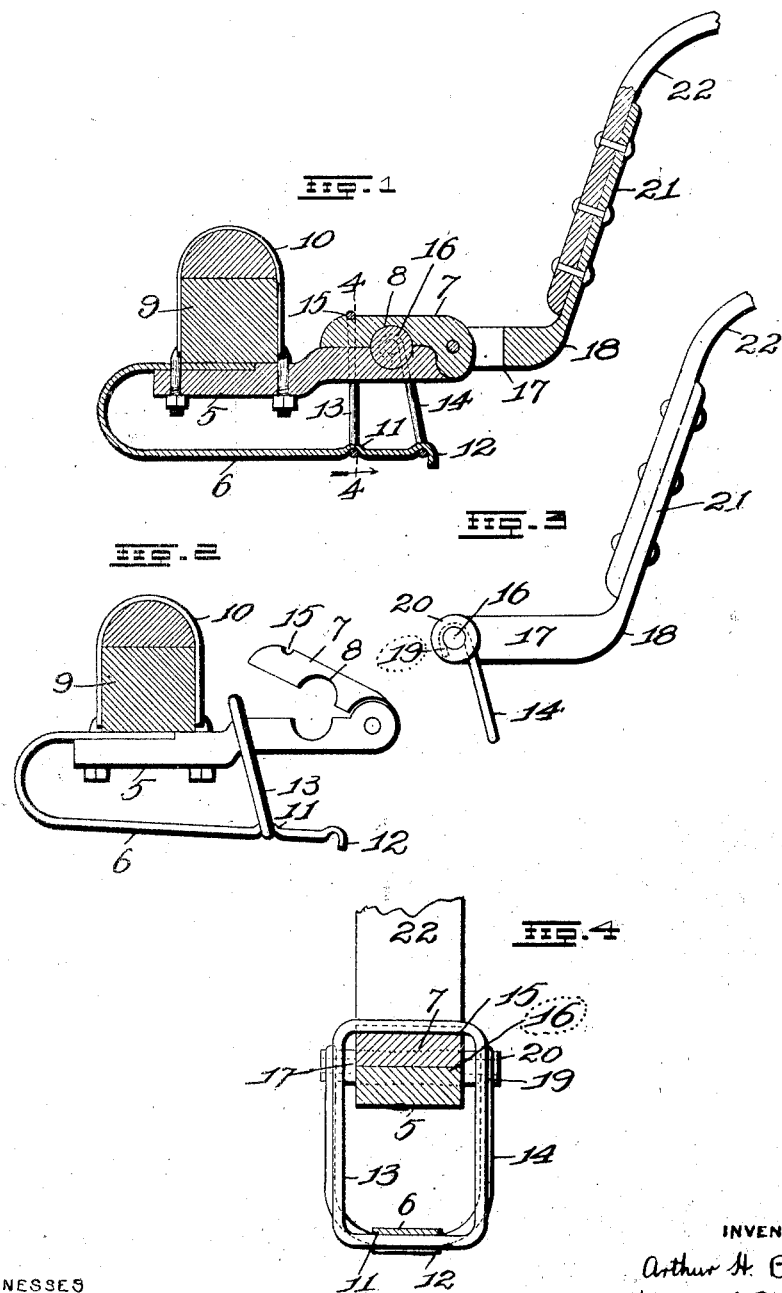
WITNESSES
INVENTORS
Arthur H. Bommer
William J. Robert
by Hopkins & Eicks Attys.

UNITED STATES PATENT OFFICE.

ARTHUR H. BOMMER AND WILLIAM J. ROBERT, OF ST. LOUIS, MISSOURI.

SHAFT-COUPLING.

No. 882,739.　　　　Specification of Letters Patent.　　　Patented March 24, 1908.

Application filed May 28, 1907. Serial No. 376,135.

*To all whom it may concern:*

Be it known that we, ARTHUR H. BOMMER and WILLIAM J. ROBERT, citizens of the United States, and residents of St. Louis, Missouri, have invented certain new and useful Improvements in Shaft-Couplings, of which the following is a specification.

This invention relates to improvements in shaft-couplings, and consists in the novel arrangement, construction, and combination of parts as will be fully hereinafter described and claimed.

The object of our invention is to construct a coupling rigidly retained in position upon the axle of the vehicle, and a means whereby the shaft member is detachably connected to and held in locked position to the axle.

A further object of our invention is to construct a shaft-coupling composed of two members detachably secured together and so arranged as to lock the same when placed in operative position to prevent rattling and at the same time from becoming detached while in its operative position.

In the drawings: Figure 1 is a vertical central sectional view of our invention shown in operative position. Fig. 2 is a side elevation of one of the members showing it attached to the axle of the vehicle. Fig. 3 is a side elevation of the shaft member of the coupling. Fig. 4 is a cross-sectional view taken on the line 4—4 of Fig. 1.

In the construction of our invention we provide a member 5 to which is suitably attached a spring 6, and to the opposite end of the member is hingedly attached a jaw 7. The member 5 and the jaw 7 are each provided with a semi-circular recess 8 which forms a complete circular opening when the member 5 and jaw 7 are in closed position as shown in Fig. 1. The member 5 is attached to the axle 9 of the vehicle by the usual clips 10.

The spring 6 is provided with a bent portion 11 and a hook 12 which form recesses in which are supported links 13 and 14, the link 13 passing upwardly and around the member 5 over the jaw 7 and resting in a semi-circular groove 15 formed in the upper surface of the jaw and to the rear of the semi-circular opening.

In the opening formed by the member 5 and jaw 7 is placed the pin member 16, its ends securely fastened to the bifurcated end 17 of the shaft member 18 and upon the projecting ends of the pin 16 are located the ends 19 of the link 14 and are prevented from becoming detached from the ends of the pin by means of the washers or the like 20. The shaft member 18 terminates into a flattened portion 21 by which the coupling is secured to the shaft 22 which is done by riveting or bolting as found most desirable.

By means of the link 14 being carried by the pin 16 of the shaft member 18 and in conjunction with the spring 6 its hook 12 fitting over the horizontal portion of the link will prevent the shaft member of the coupling from becoming detached from the member 5 should the link 13 by accident be displaced and even if the jaw 7 were to be in the position as shown in Fig. 2 the spring 6 by means of a tension upon the link 14 will hold the pin 16 in the semi-circular recess of the member 5. The jaw 7 is held in locked position upon the pin by means of the link 13 and held in this position by the tension of the spring 6. The spring in this connection prevents the members from becoming disconnected and at the same time acts as an anti-rattler, and yet permits sufficient movement between the shaft and axle to accommodate the irregularities on the surface over which the vehicle is being propelled.

By a device of this construction separate washers are dispensed with, and there is no possible way in which the shaft may become disconnected from the vehicle by accident while the vehicle is being propelled by the animal.

Having fully described our invention, what we claim is:

1. A shaft-coupling comprising an axle member, a jaw pivotally connected to the axle member, a spring carried by the axle member, a shaft member detachably held in position upon the axle member, a link carried by the shaft member and contacting with the spring to retain the shaft member in contact with the axle member and a link surrounding the jaw, axle member and spring, substantially as specified.

2. A shaft coupling comprising an axle member provided with a semi-circular recess, a jaw provided with a corresponding semi-circular recess and hinged to the front end of the axle member, a shaft member, a pin carried by the shaft member to rest in the semi-circular recesses formed by the axle member and jaw, a spring carried by the axle member and extending horizontally beneath the same, a link carried by the pin and supported on a hook formed on the end of the spring, a
link surrounding the jaw axle member and
supported in a recess formed in the top of the
jaw, and a recess formed in the spring to re-
tain the jaw in close contact upon the axle
member, substantially as specified.

In testimony whereof, we have signed our names to this specification, in presence of two subscribing witnesses.

ARTHUR H. BOMMER
WILLIAM J. ROBERT.

Witnesses:
ALFRED A. EICKS,
WALTER C. STEIN.